United States Patent [19]
Christensen

[11] 3,734,175
[45] May 22, 1973

[54] HEAT EXCHANGER
[75] Inventor: Donald W. Christensen, Racine, Wis.
[73] Assignee: Young Radiator Company, Racine, Wis.
[22] Filed: Aug. 30, 1971
[21] Appl. No.: 175,991

[52] U.S. Cl. .................165/158, 285/137, 165/176
[51] Int. Cl. ................................................F28f 9/16
[58] Field of Search.....................165/82, 158–161, 165/162, 81, 82; 285/137 R

[56] References Cited
UNITED STATES PATENTS

| 3,155,404 | 11/1964 | Brown, Jr. et al. | 285/137 R |
| 3,377,087 | 4/1968 | Samerdyke et al. | 285/137 R |
| 3,430,323 | 3/1969 | Brown et al. | 29/157.3 R |
| 3,572,429 | 3/1971 | Myers | 165/158 |

Primary Examiner—Charles J. Myhre
Assistant Examiner—Theophil W. Streule, Jr.
Attorney—Arthur J. Hansmann

[57] ABSTRACT

Apparatus, and method, pertaining to bonding tube-supporting plates to the end hubs of what commonly is designated as "Fixed Tube Bundle Heat Exchangers." A shell surrounds a tube bundle having a header plate at each end. The header plates are bonded to the ends of the shell by method and means of a snap ring anchored in the shell, with the plate on the snap ring. A ring of bonding material is then fused to the circumference of the plate at the shell interior and on the ring.

5 Claims, 10 Drawing Figures

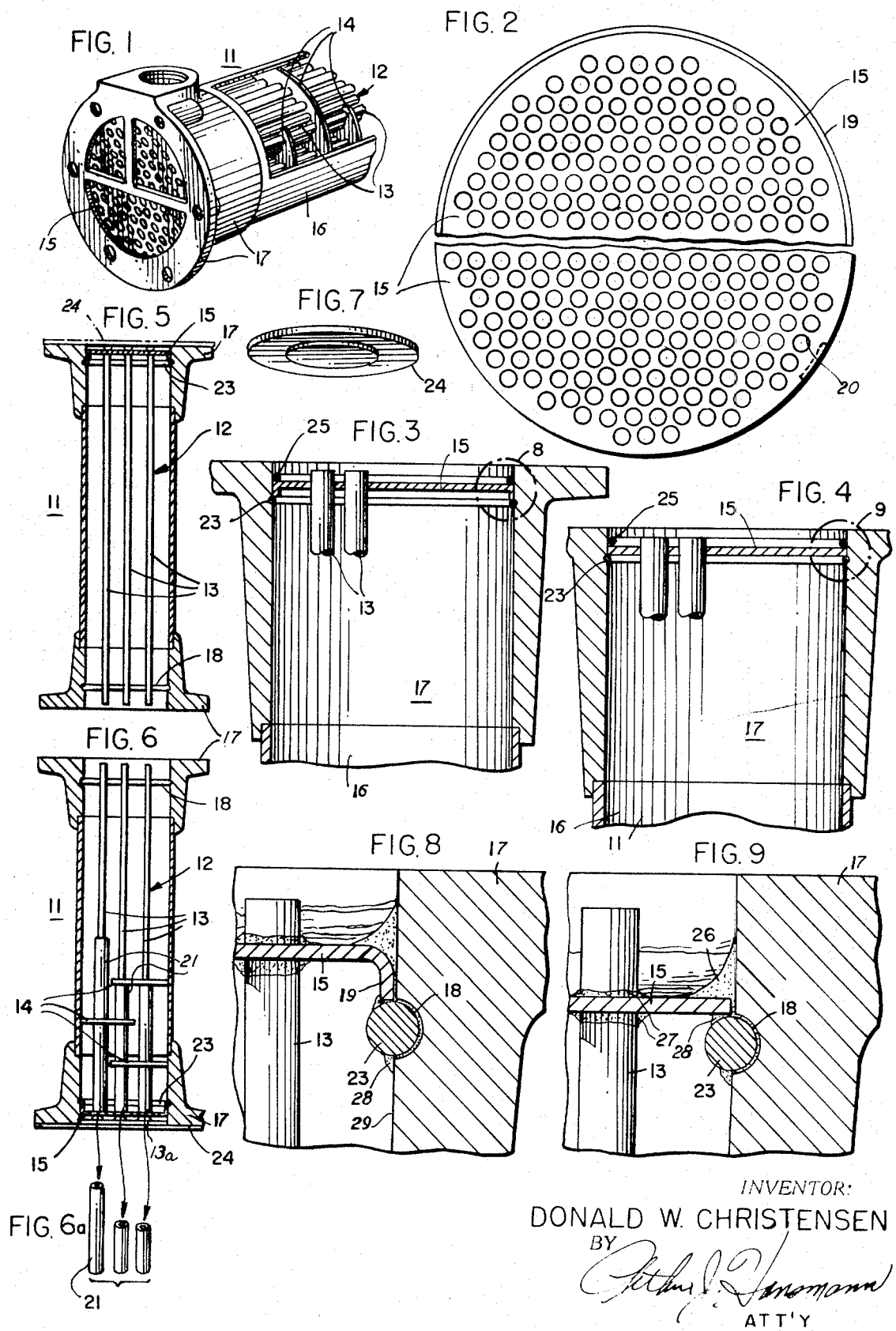

HEAT EXCHANGER

BACKGROUND OF THE INVENTION

This invention relates to heat exchangers of the type required for heating and/or cooling liquids and/or gases for power producing equipment such as turbo-charged diesel engines, gas turbines, hydraulic power systems, plastic processing equipment, internal combustion engines, heating lubricating oil, for newspaper delivery trucks, and the like.

As shown in the drawing, heat exchangers of this kind require disk-shaped header plates with a plurality of tube apertures very closely spaced inwardly of the perimeter of the header plate. One of the past problems in structuring this type of heat exchanger, has been the effective bonding of the header plates adjacently inward to the respective end hubs. In some instances, the header plate distorts under heat when the tubes are bonded to the plate, or when the plate is bonded to the shell. Any distortion which is not compensated for results in an inferior bond and can lead to leakage of the fluid.

The main objects of this invention, therefore, are to provide an improved means and method for effecting a complete and permanent, fluid-tight bonding of the tube plates in the open ends of the respective end hubs; to provide an improved bonding of either a perimetrically flanged or a planar header plate; to provide an improved structuring of heat exchangers of this kind wherein the core unit includes a series of alternated, axially spaced baffles of less-than-circular form; to provide heat exchangers of this type with an improved retaining ring fixed on the inside of the end hub for effecting a permanent bond of the plate to the end hub; and to provide a heat exchanger of this type of such simple and practical construction as to make its manufacturing and marketing very economical and its use by purchasers thereof most facile and highly gratifying.

BRIEF DESCRIPTION OF THE DRAWINGS

FIG. 1 is a perspective view of one end of a conventional fixed-tube-bundle heat exchanger embodying this invention.

FIG. 2 is an enlarged face view of the upper one half portion of a perimetrically flanged header plate, and of the lower one half portion of a header plate without a perimetrical flange.

FIG. 3 is an enlarged view of a sectioned portion of FIG. 1 and showing a perimetrically flanged header plate set within an end hub ready for the bonding of the two parts.

FIG. 4 is a view similar to FIG. 3 but showing a non-flanged header plate ready for bonding to the end hub.

FIG. 5 is a view of a section of FIG. 1 and showing the first preliminary step in securing a few tubes to one of the header plates.

FIG. 6 is an inverted view of what is shown in FIG. 5, but preparatory to setting the other header plate in the other end hub and with parts added thereto.

FIG. 6a is a perspective of the three types of sleeves used in the axial spacing of the staggered baffles.

FIG. 7 is a perspective view of an auxiliary disk used in effecting the assembling of such core units.

FIG. 8 is an enlarged, fragmentary view of the general disposition of the final bonding of the header plate shown in FIG. 3, with parts added thereto.

FIG. 9 is a view similar to FIG. 8 and showing the final bonding of the header plate of FIG. 4, with parts added thereto.

DETAILED DESCRIPTION OF THE PREFERRED EMBODIMENT

A heat exchanger 11 is shown to include a core unit 12 consisting of a battery of tubes 13 embraced by axially-spaced radial baffles 14. The opposite ends of the tubes 13 are bonded to header plates 15 to form the core unit which is embraced in a cylindrical shell 16, the opposite extremities of which are telescoped into the recessed ends of the respective end hubs 17 wherein the respective header plates 15 are bonded adjacently inward of the outer ends of the end hubs 17. Each hub 17 is formed with a groove 18 adjacently inward of the flanged end.

As will be noted from FIG. 2, the plates 15 have holes 20 closely spaced with very small amounts of plate stock between them. Also, as will be noted from FIGS. 2, 3, and 8, such header plates 15 may be formed with a perimetrical flange 19 or they may be strictly planar, which is non-flanged. The baffles 14, as will be noted between FIGS. 1 and 6, are substantially semi-circular in contour. These are spaced axially along the core unit 12 by different lengths of sleeves 21 (FIGS. 6 and 6a) in alternating axial dispositions.

One feature of this invention is the provision of a groove 18 in each end hub 17 adjacently inward of the open end of the hub. This is for seating a heat-resistant snap ring 23 in the groove 18 for support of the header plate 15, pending the application of the bonding material to anchor the header plate to the respective end hub 17. Another feature is effecting the completed assembly of the core unit 12 within the assembled shell 16 and the two end hubs 17 (see FIG. 5 and 6).

The distinctiveness of these two features will be confirmed by this inventor's prior procedure as set forth in U. S. Pat. No. 2,783,980. The cited patent discloses an extended series of steps, as noted on page 3 of that patent.

The assembling of this structure set forth herein begins with the setting of a heat resistant ring in the groove 18 in the end hub 17. A header plate 15 then is set on the snap ring 23 to the side thereof toward the axially outer end of the hub 17. A few tubes 13, four or six, depending upon the over-all dimension of the finished unit, are inserted into holes 20 in the header plate 15. The extended ends 13a of these few tubes were previously flared, as shown in FIGS. 5 and 6. A plate 24, in FIG. 7, is set on the end hub 17, as shown in FIGS. 5 and 6, and in a dotted outline in FIG. 5. With that plate so placed, this preliminary assembly is turned upside down, as shown in FIG. 6. Plate 24 is not necessarily attached, and it is removed later. It holds the subassembly up in the shell 16, in the FIG. 6 position.

Thereupon another major step is taken, preparatory to completing the assembly. This step involves assembling the baffles 14 in axially-spaced positions along the core unit. It begins with setting two or more of the short sleeves 21 (FIG. 6a) over the respective tubes 13 and moving them down to what is then the lower header plate 15. This is followed by placing the baffles 14 on the tubes 13, and then more of the sleeves 21 down over the respective tubes 13, including some long sleeves. Another baffle 14 then is dropped down onto these tubes 13. Notice the baffles are alternately disposed in opposite axial positions to the first positioned baffles 14. This procedure is continued until the desired number of baffles 14 have been positioned in the shell. The other header plate 15 is then set down over upper ends of all the tubes 13 to rest on a snap ring 23 which has been placed in the groove 18 in the upper end in FIG. 6. Also, all the additional tubes 13 are added by telescoping them through the plate 15 and the tube openings in the baffles 14. The tubes 13 are eventually bonded to the plates 15, at both ends of the tubes, and bonding fillets 27 are formed.

A solder ring 25 (FIG. 3 or FIG. 4) is set on this now upper header plate 15. In the conventional manner, such as by heating, this ring 25 when heated is rendered sufficiently fluid to form as at 26 and flow around the perimeter of the respective header plate 15, and around the opposed faces of the groove 18 and the ring 23 with a portion of the solder spreading around the ring 23 and forming the fillets 28 at the top and bottom of the rings 23, with the top fillet 28 fluid-sealing with the plate 15, and the fusion material fluid seals between the plate 15 and the inner surfaces of the shell 16 and forms a mechanical joint as well. So the ring 23, projects beyond the shell surface 29, and the ring 23, plate 15 and surface 29 are all bonded to each other, as illustrated in FIGS. 8 and 9. In this manner, a different and more reliable exchanger is provided. The rings 23 are avilable to accommodate the shrinkage in the plates 15 when the latter are heated, and they provide a shelf for accumulation of the bonding material for the filleting described. Rings 23 are endless.

The thusly finished assembly is ready for attachment to appropriate end caps, as shown in the aforesaid noted U. S. Pat. No. 2,783,980.

It should now be understood that in prior art heat exchangers and methods of making same, the heat applied to the header plates 15 causes shrinkage at the periphery of the plates, and such skrinkage commonly resulted in leakage or at least a weakness in the joint between the header plate periphery and the adjacent wall of the exchanger shell or end hub. With the present invention, the variations in sizes, including the shrinkage consideration, are not detrimental and in fact are overcome by the use of the assembly described, including the support ring 23 and the ring 25 which is a ring of bonding or fusion material, such as a high-temperature bonding or brazing material like silver solder. The bonding ring fuses the plate 15 and the exchanger housing or shell and the support ring 23 all together so that there is a fluid-tight and a mechanically strong bond.

Variations and modifications in the details of the structure and arrangement of the parts may be resorted to within the spirit and coverage of the appended claims.

What is claimed is:

1. A heat exchanger for cooling liquids, comprising a shell for the flow of liquid therethrough and having a circular groove spaced from the end of said shell and extending on the interior surface of said shell, a heat-resistant ring permanently fixedly anchored in said groove and projecting from said shell to extend beyond the interior surface thereof, a core unit including a plurality of tubes and a header plate bonded together, said header plate and said heat-resistant ring being substantially the same over-all dimension to permit said header plate to overlie said heat resistant ring and be in abutment with the latter and disposed only to the side of said ring toward said end of said shell, and said shell and said heat-resistant ring and said header plate all being fluid-tightly bonded to each other.

2. The heat exchanger as claimed in claim 1, wherein said header plate is flanged at the periphery thereof, and edge of the flange is disposed in abutment with said heat-resistant ring.

3. The heat exchanger as claimed in claim 1, wherein said shell has two oppositely disposed open ends, and said tubes extend between said open ends and one said header plate is at each end of said tubes and extends across each open end of said shell.

4. The heat exchanger as claimed in claim 1, wherein said core unit includes baffles and spacers disposed along said tubes and there is one said header plate at each end of said tubes and bonded to said tube ends.

5. The heat exchanger as claimed in claim 1, wherein said fluid-tight bonding between said shell and both of said plate and said ring presents fillets of bonding therebetween.

* * * * *